(12) United States Patent
Jacksen

(10) Patent No.: US 6,612,076 B2
(45) Date of Patent: *Sep. 2, 2003

(54) POROUS FLANGE

(76) Inventor: Mark Jacksen, 914 Wild Rose Ave., Monrovia, CA (US) 91016

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 09/347,960

(22) Filed: Jul. 6, 1999

(65) Prior Publication Data

US 2002/0066236 A1 Jun. 6, 2002

(51) Int. Cl.[7] ................................................. F04F 19/00
(52) U.S. Cl. ............................. 52/27; 52/34; 362/147; 362/364; 362/457; 248/27.1
(58) Field of Search ................................. 52/27, 34, 38; 362/147, 364, 348, 457; 248/27.1, 343

(56) References Cited

U.S. PATENT DOCUMENTS 5,083,248 A 1/1992 Troy

*Primary Examiner*—Carl D. Friedman
*Assistant Examiner*—Steve Varner
(74) *Attorney, Agent, or Firm*—Joseph E. Mueth

(57) ABSTRACT

The invention is a flange device used for flush mounting construction fixture or hardware trims. The invention reduces the potential of a hair line crack between dissimilar materials. The invention can be molded, extruded or otherwise formed into nearly any shape and designed to work with a large variety of different fixtures, hardware and trims. The portion of the flange in contact with a surfacing material (those applied at plastic state) bonds the two surfaces together and is an interface which isolates the dissimilar fixture or hardware material.

10 Claims, 3 Drawing Sheets

POROUS FLANGE

BACKGROUND OF INVENTION

For many years, manufacturers have offered construction fixtures and hardware which are designed to be recessed within a wall or other structures with the outer exposed edges or trim mounted flush with the adjacent finished surfaces of structures. In some cases, fixtures and hardware trims which are not intended by the manufacturer to be flush mounted are also installed flush. In both cases, it has not been possible to successfully control a hair line crack in the surfacing material which almost always develops over time around a portion or all of the perimeter of the outer edge or surface of the exposed flange surrounding the fixture or hardware trim.

Various techniques have been used in an effort to deal with the hairline crack such as caulking or taping followed by trowel coating with mud and, following drying, by sanding smooth. These procedures are laborious and, in many cases, do not endure.

Recessed construction fixtures and hardware are also commonly provided with an overlap trim which conceals the gap or crack between the fixture and the adjacent surfacing material. In other cases, the construction fixtures or hardware, such as a shower head or pendant light, extends through and beyond the finished wall or ceiling surface and a canopy or other trim is provided at the finished surface to conceal the gap or crack, or to conceal hardware present within the wall or ceiling that may need to be accessed. The overlap trim itself is usually a removable plate or frame which can also provide access into a fixture or hardware, as a means to terminate a system at the finished surface. The most common trim is a overlap trim which extends over and beyond the finished surface. Thus, creates the visual illusion of no surface material cracks or gap since the cracks or gap are hidden behind the overlap trim.

Some manufacturers of recessed construction fixtures offer flush mount trims sometimes referred to as trimless, flush flange, outer ring with inner plate. The fixture and its flange are commonly made from metal and the surfacing materials is applied up to the fixture or the flange, making it flush with the plane of the finished surface. This method does not provide a good bond between the two dissimilar materials. As a result, a hair line crack usually occurs in the surfacing material around the outer perimeter of the fixture or its flange which is visually evident and unaesthetic in appearance.

Even though it is not so common, manufacturers have for many years offered recessed construction fixtures with trims which are designed to be flush mounted into finished surfaces of structures. However, none of these fixtures offer a low likelihood of the development of a hairline crack in the surfacing material.

Construction fixtures and hardware are usually made of metal or plastic which are dissimilar materials to the surfacing material of most structures which typically is plaster, mud, stucco, cement or grout. Metal expands and contracts when heated and cooled at a different rate than most surfacing materials. In addition, in the case of aluminum, the coefficient of expansion is quite unlike that of the usual surfacing materials. Differences in moisture absorption and expansion due to moisture absorption could also be present in surfacing material as compared to plastic or metal.

While not bound by any theory, it is my belief that these differences in thermal characteristics and moisture absorption are likely to cause the development of the hairline cracks around the outer exposed perimeter of known construction fixtures and hardware.

FIELD OF THE INVENTION

This invention relates to flush mounting construction fixture and hardware trims into finished surfaces of structures, and more particularly relates to a porous interface flange which provides improved bonding between the flange and the adjacent surfacing material.

SUMMARY OF INVENTION

The invention comprehends:

A flange adapted for flush mounting in the surface of a structure, said flange being composed of a porous material which forms a strong adherent bond with the composition forming said surface of the structure.

A flange adapted for flush mounting in the surface of a structure to closely surround the outer exposed portion of a trim for a construction fixture or hardware, said flange forming a flush surface with the exposed portion of the trim, said flange being composed of a porous material which forms a strong adherent bond around its outer extremity with the opposition forming said surface of the structure.

A structural system comprising in combination a surface of a architectural structure having an opening therein for receiving a construction fixture or hardware and having an outer exposed trim flush with said surface, a flange mounted in said surface of said structure to closely surround the said outer exposed portion of said trim, and a composition forming the surface of said structure, said flange being composed of a porous material which forms a strong adherent bond around its outer extremity with the composition forming said surface of the structure.

A method of forming an aesthetically pleasing, crack-free appearance around an opening in the structure of an architectural structure, said opening being adapted to receive a construction fixture or hardware, said method including the following steps in any sequence:

(a) forming said opening;

(b) causing a construction fixture or hardware to be received in said opening;

(c) applying a trim for said fixture or hardware having an exposed outer portion;

(d) causing a flange to be fixed in said surface surrounding said outer exposed portion; and (e) applying surfacing material on said surface abutting said flange to form a flush surface with said flange, wherein said flange is composed of a porous material which forms a strong adherent bond with the said surfacing material.

The invention is adapted to flush mounting construction fixture and hardware trims into the surfacing material of a building structure, retaining wall, landscape structures, sculpture or any other similar construction, herein referred to as "architectural structure". One advantage of the invention is that it creates an interface for the fixture or hardware for flush mounting between two dissimilar materials which would normally not bond well together. The invention reduces the likelihood of hair line cracks as compared to current flush mount trim art. The invention can be designed to nearly any shape that is required. Aesthetically it improves the finished appearance of a structure by reducing visual clutter associated with the more commonly used overlap trim which projects outwardly from the finished surface. Aesthetically, the invention reduces the likelihood of a hairline crack normally associated with prior flush mounted trim for fixtures and hardware.

The elimination of the hairline crack is of particular significance in interior applications by providing an improved enduring appearance. In exterior wall and related structures, the elimination of the hairline crack also prevents unwanted water intrusion which can cause electric shorting, corrosion, and, in cold climates, allow for the formation of ice which can expand and break the stucco or other exterior finishing material.

The invention provides a controlled gap between the outer trim perimeter and the inner flange perimeter so that the trim or plate can be removed or moved without breaking the surfacing material in applications where removal or movement is required. In some applications, the controlled gap also allows the inner trim or inner plate to rotate or move without breaking the surfacing material.

The controlled gap is also significant in providing a novel and attractive aesthetic effect.

The invention offers a method for flush mounting construction fixture and hardware trims to finished surfaces of structures. However, the invention itself does not alter the function of the fixture or hardware.

The tooling for the flange of this invention can be relatively of low cost, and it can be relatively inexpensive to manufacture parts. In general, the flange is preformed from a suitable material by known forming techniques such as molding or by extrusion.

The flange of the invention is made of a porous material which is a poor conductor of electricity. The porous material has similar thermal characteristics and similar absorption characteristic to that of the surfacing material. Preferably, the flange is a porous ceramic, and more preferably earthenware such as a low fire bisque ceramic having thermal characteristics which are approximately the same as that of a surfacing material such as plaster, mud, stucco, cement or grout.

Earthenware is thermally more dimensionally stable than commonly used metals for this application. Consequently, thermal stress is minimized as compared to metals.

The porous flange material can also be composed of a composite material such as fiberglass reinforced plaster or cement.

The porous flange material is permeable to liquids. The porosity is such that the pores could be fully saturated if enough liquid were applied even though saturation is not required for the invention to bond with the surface material of a structure.

THE DRAWINGS

DESCRIPTION OF PREFERRED EMBODIMENTS

Figure 1:
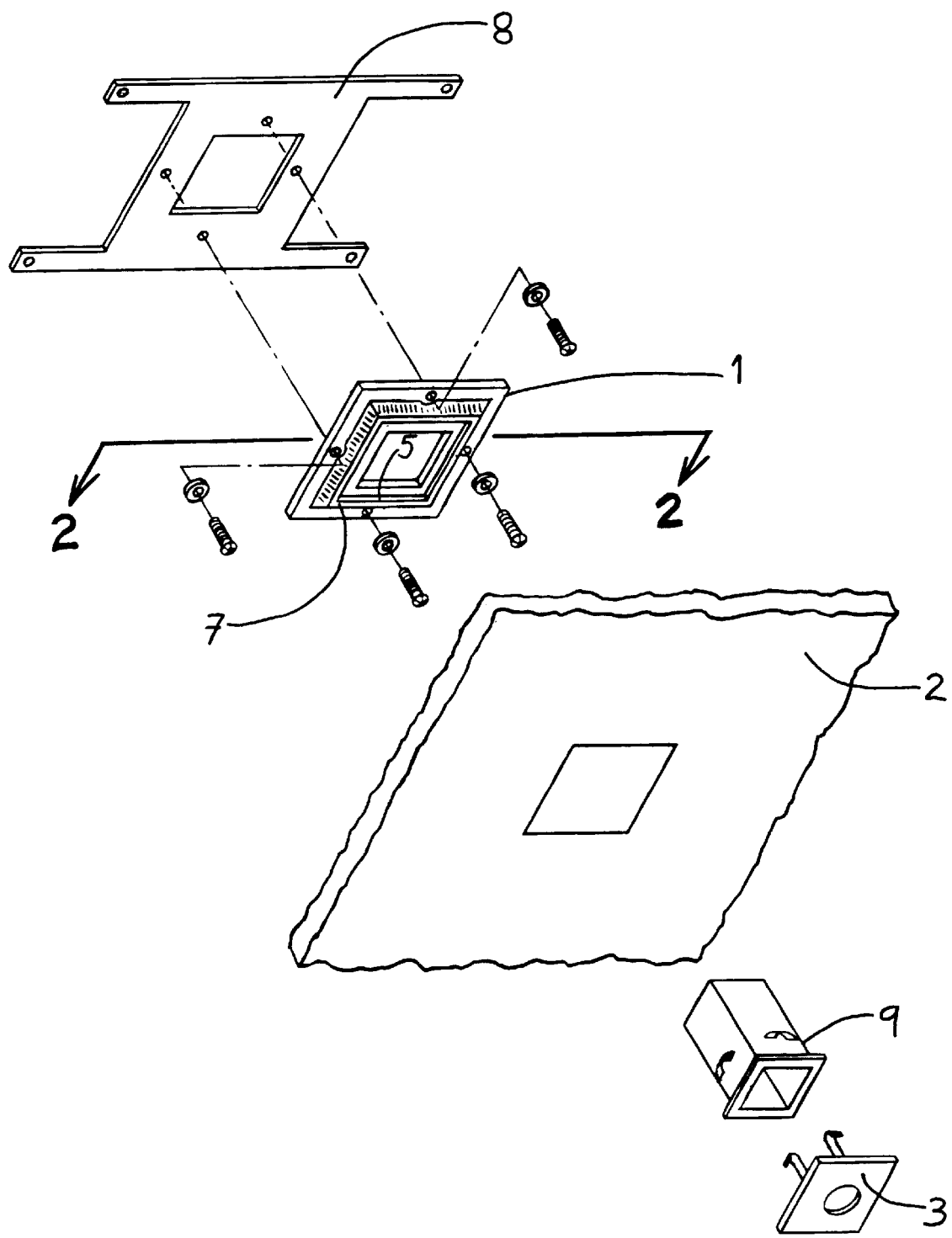
FIG. 1 is an exploded view of a typical and preferred embodiment, illustrative of the invention.
Figure 2:
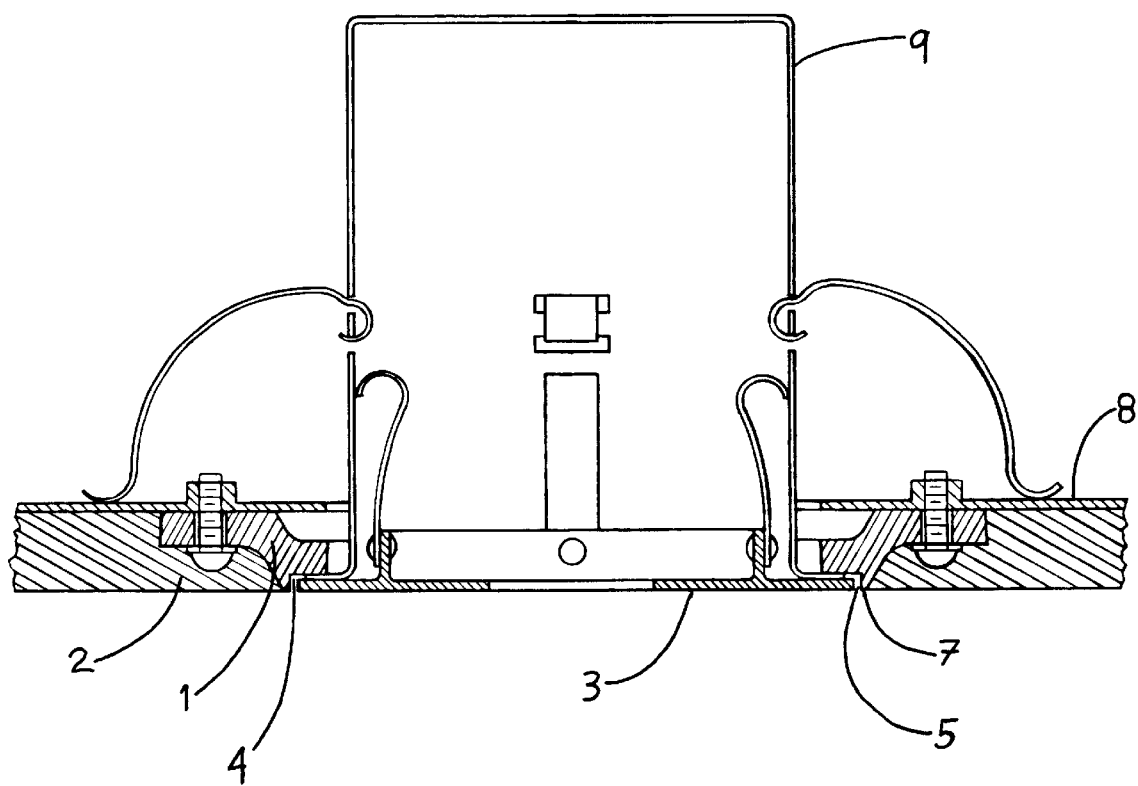
FIG. 2 is a section view of the assembled elements of FIG. 1 taken along the line 2—2 in FIG. 1.
Figure 3:
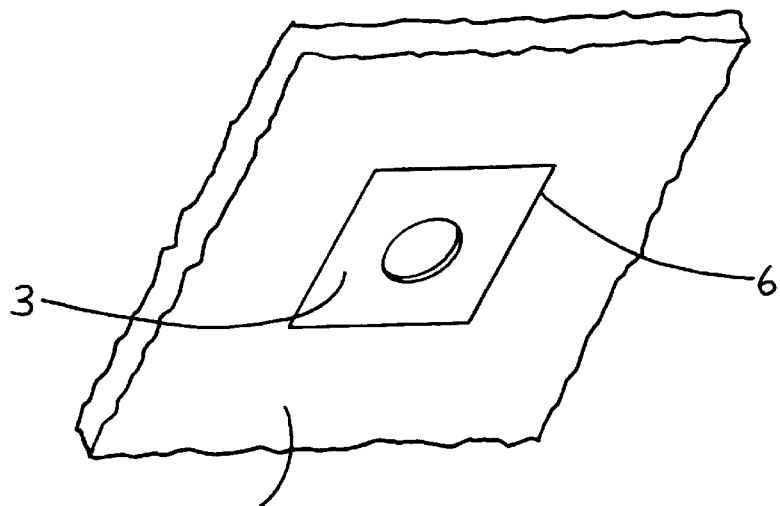
FIG. 3 is a perspective view showing the general appearance of the flange and structural system of one illustrative embodiment of this invention in installed and finished form.
Figure 4:
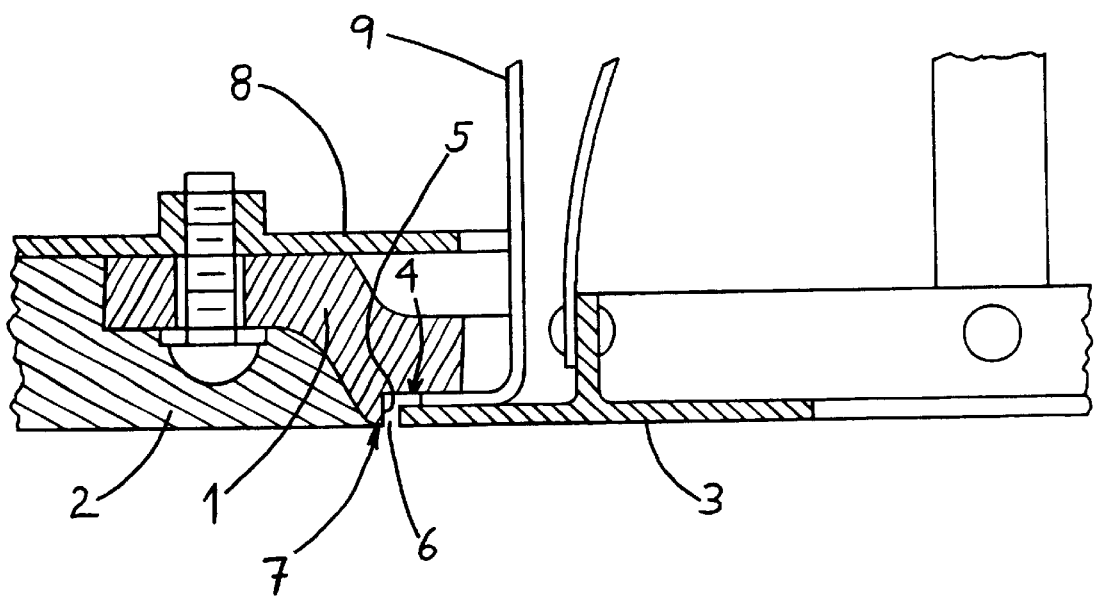
FIG. 4 is an enlarged view of a portion of FIG. 2.

Turning to FIGS. 1, 2, 3, 4 in more detail, the invention is an interface flange (1). The interface flange is made up of a porous material as described herein above.

The finish surface material (2) or joint compositions (or deeper/structural if concrete) are applied in a plastic state. The surfacing material is made of dry components which are blended together with liquid to form a plastic state composition. It is in the plastic state that finish surfaces or joint compositions are applied and/or pored.

The porous flange (1) invention is permeated by the liquid in the surfacing composition (2), thus creating a bond between the porous flange (1) and the surfacing composition (2) when the composition dries. In order to improve the bond, the porous flange (1) is preferably first moistened prior to application of the surfacing composition. The invention is designed to work with essentially non-metallic and non-wood surfacing materials. However, the invention is designed to work with nearly any type of trim (3) or plate material.

The invention is a porous flange (1) that fits around a trim. The flange is designed with a step (4) which is a seat for the trim (3). The depth of the step (4) matches the thickness of the trim (3) so that the trim is flush with the outer projection or surface (7) of the flange (1). The inside perimeter (5) of the flange (1) is slightly larger than the trim (3) outer perimeter, which creates a controlled gap (6). The flange projection (7) provides an edge to trowel or knife the surfacing composition (2) against. The flange projection (7) is aligned to the finish elevation of the surfacing composition (2) Since the flange projection (7) is installed at the finished elevation of the surfacing composition (2) and the trim (3) depth matches the flange step (4) depth, the two elements are flush with the finish plane of the surfacing composition (2).

The flange could attach to: the structure, fixture, hardware, surfacing material or supporting system such as a pipe or conduit by a variety of means which are known. Those skilled in the art can be expected to devise still other ways of using this invention. The invention may be designed and used with many fixture and hardware types, and therefore how it attaches to a structure, fixture, hardware, surfacing material or other supporting system will vary greatly.

The invention offers a new opportunity to flush mount fixture and hardware trims with a reduced chance for a hair line crack, normally associated with flush mounting. The invention eliminates the need for laborious caulking, taping and sanding. The invention offers architects, designers and end users a viable solution for flush mounting fixtures and hardware trims. The invention can be molded into almost any shape to conform to existing and future fixture or hardware designs. Since the invention can be cast, ground, molded, poured, machined, pressed, extruded or otherwise formed, into almost any shape, it is not limited to any particular forms or shapes contained within this application.

The invention is applicable to fixtures and hardware generally including electrical outlets, electrical plugs, in-wall jacks, light fixtures, heat and air conditioning registers, plumbing fixtures, pendant lights, etc.

Since the invention has unlimited attachment and/or support possibilities including but not limited to a: fixture, hardware, surfacing material, frame, pipe, duct, conduit supporting system and so on, how the flange attaches should not be limited to any particular forms, shapes or methods contained in this application.

In the embodiment shown in the drawings, the flange 1 is attached to mounting plate 8. Then hardware 9 is attached to the assembly and then the new assembly comprising elements 1, 8 and 9 is attached to the building structure, normally studs. Then the surfacing material is applied to abut flange 1. This method is an option of new construction. For renovation of existing structures, other sequences would be followed.

SEQUENCE OPTIONS

Existing Construction
   Cut opening
   Install flange and/or flange assembly
   Install fixture or hardware
   Apply surface materials Existing Construction
   Cut opening
   Install fixture or hardware
   Install flange and/or flange assembly
   Apply surface materials Existing Construction
   Cut opening
   Install fixture or hardware with integral flange
   Apply surface materials New Construction
   Install flange and/or flange assembly
   Install fixture or hardware
   Apply surface materials New Construction
   Install fixture or hardware
   Install flange or flange assembly
   Apply surface material New Construction
   Install fixture or hardware with integral flange
   Apply surface material The types of trims which this invention can work with is unlimited and, therefore, the invention should not be limited to any particular types, forms or shapes.

Since the invention can be integrated into non-movable and/or non-removable trim applications, it is not be limited to static or dynamic applications.

The invention is defined by the following claims.

What is claimed is:

1. A flush mount system for mounting within the finish surface and flush with the finish surface plane of an architectural structure comprising, in combination, a porous flange projection including an outer surface edge, and a trim for a construction fixture or hardware; said flush mount system further comprising:

said porous flange projection including an outer surface edge having an opening which receives and closely surrounds said trim;

said porous flange projection outer surface edge being flush with the outer surface of said trim; and said porous flange projection outer surface edge adapted to provide a guide for the application of the composition forming said finish surface plane of said architectural structure surrounding and flush to said porous flange projection outer surface edge;

said porous flange projection including an outer surface edge composed of a porous material adapted to make a strong adherent bond with said composition forming said finish surface and finish surface plane and thereby creates an aesthetically pleasing, crack-free appearance in said finish surface plane of said architectural structure.

2. A structural system comprising, in combination, the finish surface and finish surface plane of an architectural structure, a porous flange projection including an outer surface edge, and a trim for a construction fixture or hardware; said structural system further comprising:

said porous flange projection including an outer surface edge forming an opening in said finish surface and finish surface plane which receives and closely surrounds said trim;

said porous flange projection outer surface edge providing the guide for application of said composition forming said finish surface plane surrounding and flush to said porous flange projection outer surface edge;

said finish surface plane, said porous flange projection outer surface edge, and the outer surface of said trim being flush with one another;

said porous flange projection including an outer surface edge, being composed of a porous material which makes a strong adherent bond with said composition forming said finish surface and finish surface plane, thereby creates an aesthetically pleasing, crack-free appearance in said finish surface plane of said architectural structure.

3. The system of claim 1 or 2 wherein the porous flange projection including an outer surface edge is composed of a porous ceramic material.

4. The system of claim 1, 2 or 3 wherein said porous ceramic material is earthenware.

5. The system of claim 1, 2 or 3 wherein said porous ceramic material is bisque.

6. The system of claim 2 wherein the finish surfacing composition is plaster.

7. The system of claim 2 wherein the finish surfacing composition is cement.

8. The system of claim 2 herein the finish surfacing composition is stucco.

9. The system of claim 2 wherein the finish surfacing composition is mud.

10. The system of claim 2 wherein the finish surfacing composition is grout.

\* \* \* \* \*